United States Patent Office 3,349,796
Patented Oct. 31, 1967

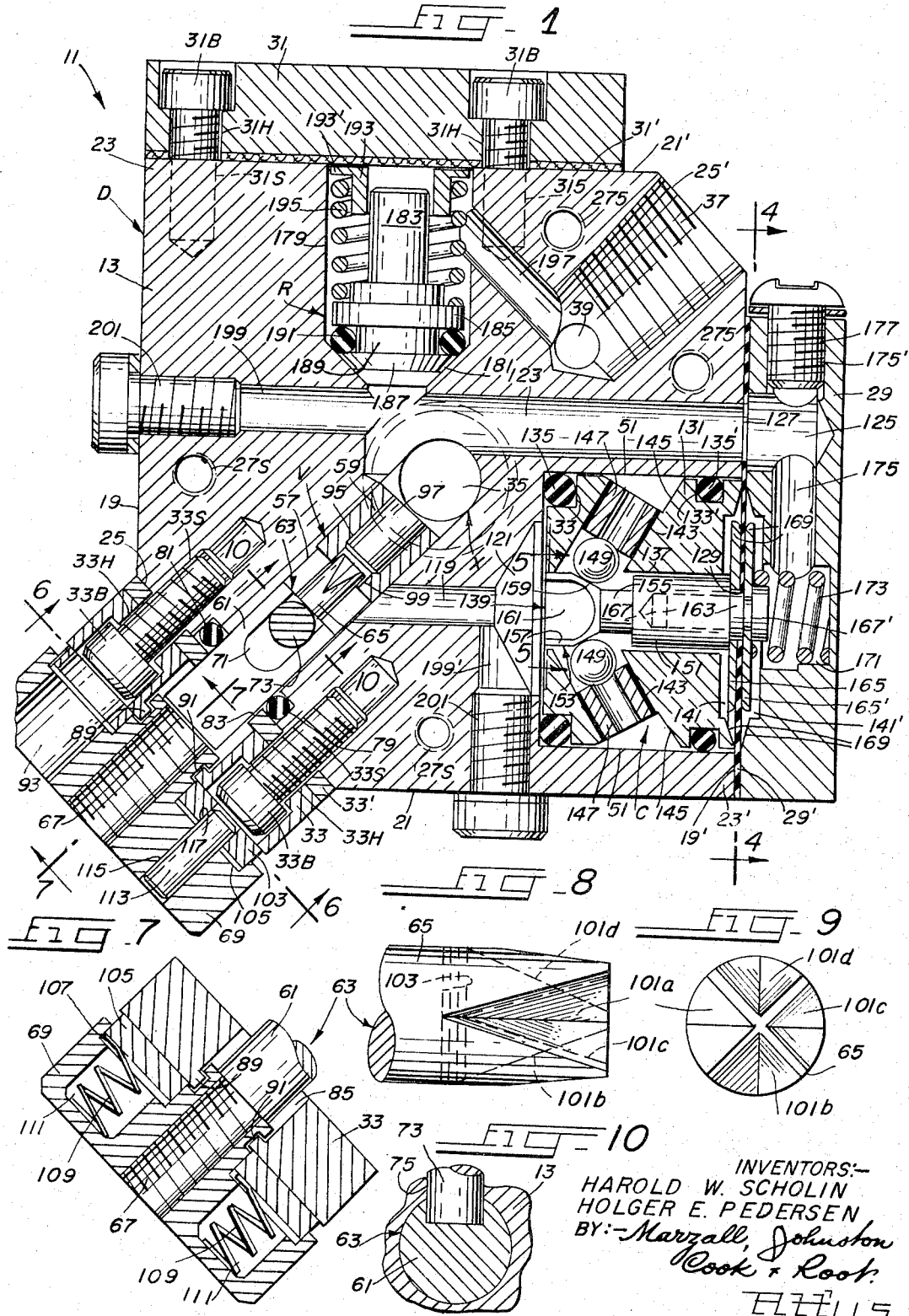

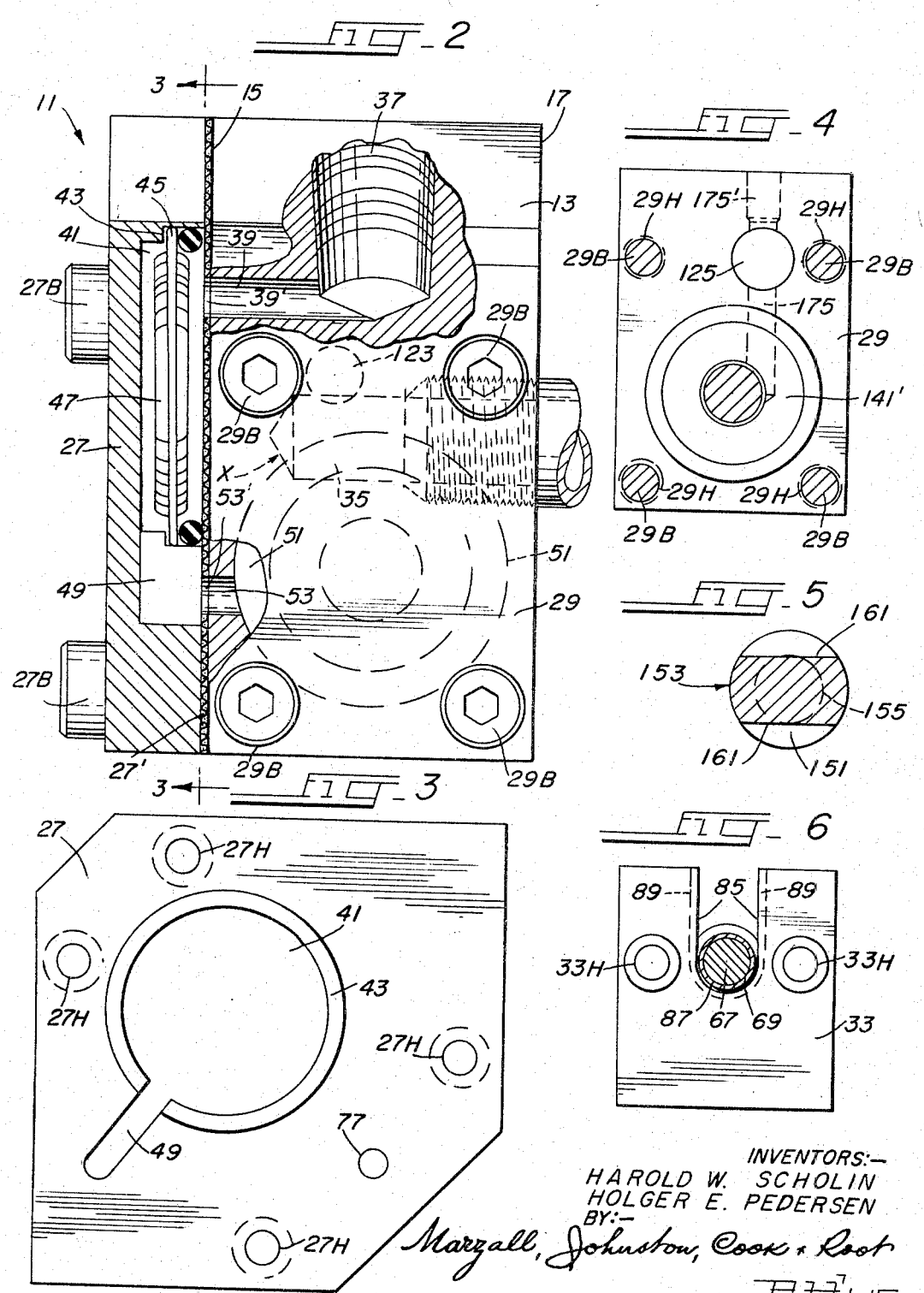

3,349,796
FLUID FLOW CONTROL UNIT
Harold W. Scholin, 1225 N. Northwest Highway, Park Ridge, Ill. 60068, and Holger E. Pedersen, Chicago, Ill.; said Pedersen assignor to said Scholin
Filed Mar. 17, 1965, Ser. No. 440,384
17 Claims. (Cl. 137—501)

The present invention relates in general to fluid flow control, as in hydraulic systems, and has more particular reference to apparatus for precisely regulating the flow of small amounts of fluid under substantial pressure.

The precise control of fluid such as hydraulic oil at relatively high pressure, while maintaining flow at a uniform slow rate, is difficult because of the necessarily tiny flow control openings required to attain high pressure flow at minimal rates, such minute openings being easily cloggable by the infinitesimal impurities normally present even in oil filtered through the most efficient presently available filtering equipment. Furthermore, such tiny openings are susceptible of size changes in response to variations in temperature, with corresponding variation in flow rate. For example, to maintain the flow of a commonly used hydraulic oil at a rate of 1 cubic inch per minute, under pressure of 500 pounds per square inch, requires passage of the oil through a circular flow control orifice having a diameter of the order of two one-thousandths (0.002) of an inch. The area of such an orifice is of the order of 3.14 millionths (0.00000314) of a square inch. To control such flow by means of a standard needle valve having a ⅛ inch diameter valve pin requires a clearance, between the pin and its valve seat of the order of eight millionths (0.000008) of an inch. To pass oil freely through such a small clearance opening around the needle valve pin would require unusually, if not impossibly, good filtration, together with close temperature control of the needle to keep the clearance opening at a constant value. The tendency of such valves is to close in response to increase in temperature, thereby diminishing the flow of oil through the valve; and there is a tendency toward diminished flow due to the accumulation of wax and other foreign particles in the oil.

An important object of the present invention is to provide an improved fluid flow control valve having a configuration tending to prevent the clogging of the flow orifice of the valve by the tiny, usually spherical, particles of dirt normally present in even well filtered oil; a further object being to provide a valve adapted to permit fluid flow therethrough at a uniform rate at each valve setting regardless of temperature changes.

Another important object is to provide for maintaining a substantially constant pressure drop across the valve, between its inlet and discharge sides, at all times during the operation of the flow regulating apparatus, in order thus to obtain fluid flow at a uniform rate through the valve.

Another important object is to provide a fluid flow control device adapted for the delivery of fluid from a source of fluid under pressure to a load device, such as a hydraulic cylinder of the sort used in actuating machine tool components, wherein fluid under pressure is delivered in the piston cylinder to drive the component in one direction, and is then discharged from the cylinder back to the pressure source during the return stroke of the actuated component, it being an important object of the invention to provide improved check valve means permitting the return flow of fluid through the flow control apparatus, without interfering with its fluid delivering function.

The foregoing and numerous other important objects, advantages and inherent functions of the invention will become apparent as the same is more fully understood from the following description which, taken in conjunction with the accompanying drawings, discloses a preferred embodiment of the invention.

Referring to the drawings:

FIG. 1 is a sectional view taken through a fluid flow control unit embodying the present invention;

FIG. 2 is a partially sectionalized right hand end view of the unit shown in FIG. 1;

FIG. 3 is a sectional view taken substantially along the line 3—3 in FIG. 2;

FIGS. 4, 5, 6, 7, and 10 are sectional views respectively taken substantially along the lines 4—4, 5—5, 6—6, 7—7, and 10—10 in FIG. 1;

FIG. 8 is an enlarged side view of the end of a fluid flow control valve stem embodying the present invention and forming a component of the unit shown in FIG. 1; and FIG. 9 is an end view of the valve stem shown in FIG. 8.

To illustrate the invention, the drawings show fluid flow control apparatus 11 embodying the present invention and comprising duct forming means D for receiving fluid under pressure from a suitable supply source, passing said fluid to and through a flow control valve V of novel nonclogging character, and thence to a receiving chamber X adapted for connection with a fluid pressure operable device, so that fluid may be delivered to such device at a uniform rate as regulated by the valve, and returned thence to the receiving chamber X, whence it may be passed through a relief valve R to the pressure fluid supply source, the apparatus embodying pressure compensating apparatus C connected with the valve to maintain uniform pressure differential conditions across the valve.

As shown, the apparatus 11 may comprise an assembly unit embodying a metal block or slab 13 forming a main frame or base in and on which the other components of the unit may be assembled and mounted. While the block 13 may have any convenient shape, it is preferably made as shown from a substantially square slab of steel, brass or other suitable metal having top and bottom faces 15, 17, and opposed pairs of side faces 19, 19' and 21, 21', the slab having thickness of the order of one-half its width, and the surfaces 19, 21', and 19', 21 preferably intersect at right angles to form diagonally opposite ninety degree corners 23, 23' on the base block, the other two corners of the block being truncated as along parallel spaced planes making angles preferably of the order of 45° with the adjacent side surfaces 19, 21, and 19', 21' of the base block, thereby forming inclined side surfaces 25, 25' on the block, respectively in position extending between the ninety degree corner remote edges of the surfaces 19, 21 and 19', 21'.

In order to form the base block 13 to receive and support the other components of the fluid flow control unit 11, it is drilled to form inlet and outlet openings, internal chambers and interconnecting ducts; and its surfaces 15, 19', 21' and 25 are finished to form seats for cover and component mounting plates 27, 29, 31 and 33, respectively secured on the seats formed by the surfaces 15, 19', 21' and 25, as by means of suitable bolts 27B, 29B, 31B and 33B penetrating holes 27H, 29H, 31H and 33H in the cover plates and fastening in threaded bolt sockets 27S, 29S, 31S and 33S formed in the base block. Suitable sealing gaskets 27', 29', 31' and 33', having holes for receiving the bolts 27B, 29B, 31B and 33B, may be provided between the cover plates and the surfaces of the base block on which they are secured.

The receiving chamber X preferably comprises a cylindrical cavity 35 which may be formed in the base block 13 by drilling the same preferably centrally from its rear face 17 toward the front surface 15. The cavity 35 thus opens upon the face 17 of the block in position for connection with a hydraulic component, such as a piston-cylinder unit for the sort commonly used in actuating the driven components of machine tools, and like operable devices, to which fluid under pressure is to be delivered through the flow control unit 11, the inner end of the cavity 35 being closed and terminating behind the upper or front surface 15 of the block, as shown in FIG. 2 of the drawings.

The block 13 may also be formed with a fluid inlet opening 37 by drilling the same, from the inclined corner surface 25', diagonally toward the center of the block, the opening being formed preferably medially between the front and rear faces 15 and 17 of the block. As shown, the inner end of the inlet opening 37 is closed and terminates within the body of the block short of the discharge chamber or cavity 35. The block 13 may also be formed with a fluid duct 39 drilled therein, from and preferably normal to the front face 15 of the block, in position opening upon the inner closed end of the inlet chamber 37.

As shown in FIGS. 2 and 3 of the drawings, the cover plate 27 which overlies the front face 15 of the block may be formed with a shallow, preferably circular filtering cavity 41 opening upon the inner or block facing surface of the cover plate, said filtering cavity 41 having a preferably circular peripheral step or shoulder 43 facing toward the open side of the cavity and disposed medially between the bottom of the cavity and the inner block facing surface of the cover plate, said shoulder 43 providing a circular seat for receiving and supporting the circular rim 45 of a wafer-like disc filter 47 of known construction. The cover plate 27 may also be formed with an open top groove 49 connected with and extending preferably radially outwardly of the cavity 41, said groove having a bottom in alinement with the bottom of the cavity and a top opening upon the block facing surface of the cover plate. The groove 49 has an outer end terminating in the corner portions of the cover plate which overlie the ninety degree corner portion 23' formed by the intersecting block faces 19' and 21.

Beneath said corner portions of the plate 27, the block 13 may be formed with a preferably cylindrical chamber 51 opening at one end upon the block surface 19' and being disposed inwardly of and behind the front face 15 of the block, opposite the terminal end of the groove 49 in the cover plate 27, the block being formed with a duct 53 connecting the outer end of the groove 49 with the interior of the chamber 51. The gasket 27' which overlies the front face 15 of the block behind the cover plate 27 is provided with openings 39' and 53' disposed respectively in alinement with the ducts 39 and 53, through which openings said ducts communicate respectively with the open top of the cavity 41 and with the open top of the groove 49 at its end remote from the cavity 41.

The filter element 47 may be held in place upon the support seat 43 by means of a circular gasket 55, which may conveniently comprise an O-ring, preferably of resilient rubber-like material, sized to squeezingly extend between the periphery of the mounting flange 45 of the filter element and the facing portions of the gasket 27' around the opening 39', the resilient characteristics of the O-ring 55 serving to seal the edges of the mounting flange 45 in the seat 43 and thus prevent fluid flow around the filter and across the mounting seat 43. Accordingly, oil under pressure delivered through the inlet opening 37 and thence through the duct 39 into the top of the chamber 41, on one side of the filter element, will be forced to pass through the filter and thence into the bottom of the chamber 41, whence the filtered fluid may pass into the chamber 51 through the groove 49 and the connecting duct 53.

The block 13 is also formed with a control valve chamber 57, the same preferably comprising a cylindrical cavity drilled in the body 13 from and medially of the inclined surface 25 in a direction toward the center of the delivery chamber 35, the valve chamber 57 opening at its inner end into said chamber 35, and being sized at said inner end to receive a cylindrical seat forming element 59 that is press fitted therein. The chamber 57 also snugly yet slidingly receives the cylindrical body portion 61 of a valve element 63 having a stem 65 concentric with and projecting at the inner end of the body portion 61, said stem 65 having diameter less than that of the body portion 61 and being sized for cooperation with the valve seat element 59. At its end remote from the stem 65, the valve element may be formed with a concentric screw threaded portion 67 which projects outwardly of the inclined wall 25 in position to engage a manually operable actuating nut 69 turnable to project and retract the valve stem element in the channel 57. To this end, the body portion 61 of the valve element may be provided with a longitudinal pin engaging groove 71 disposed in position to receive the inner end of a pin 73 which extends through an opening 75 drilled in the body 13 from and at right angle with respect to the upper surface 15 in position extending normal to the axis of the bore 57, the outer end of the pin 73 being press fitted into an opening 77 formed in the cover plate 27.

The block 13, at and around the outer end of the valve chamber 57, where it opens upon the inclined wall 25, may be provided with a circular seat 79 concentric with and forming an enlargement of the valve chamber 57, at its outer end, said seat being sized to receive a sealing element 81, which may conveniently comprise an O-ring gasket of resilient rubbery material sized to snugly and sealingly embrace the body portion 61 of the valve stem element where it emerges from the outer end of the chamber 57, through an opening 83 formed in the gasket 33'.

As shown more particularly in FIG. 6 of the drawings, the plate 33 which overlies the gasket 33', on the inclined seat 25, in addition to the spaced openings 33H for the accommodation of the bolts which secure the plate in place on said seat, is provided with a slot 85 which extends from an edge of the plate in a direction medially between the bolt receiving openings, in a direction normal to a plane through the central axes of the bolt openings, the inner end 87 of said slot being of circular configuration and being disposed medially between the bolt openings. The plate 33 is formed with an inwardly extending lip or flange 89 bordering the opening 85, at the outwardly facing surface of the plate 33, the nut 69 having a neck formed with a peripheral groove 91 for receiving the flange 89.

In mounting the valve stem element in the chamber 57, the nut 69 may first be threaded upon the threaded valve stem portion 67, after which the body portion 61 of the stem may be applied through the gasket opening 83. The cover plate 33 may then be applied upon the nut 69 by disposing the spaced apart ends of the lip 89, at the open end of the slot 85, in the circular groove 91 of the nut 69, and then sliding the cover plate 33 onto the nut to position its groove 91 at the inner end 87 of the slot. The O-ring 81 may then be applied upon the body portion 61 of the valve stem element, after which said element may be assembled into the channel 57 in order to dispose the O-ring 81 in the seat 79 and to apply the gasket 33' and the cover plate 33 upon the seat 25 in position with their bolt holes in alinement with the bolt receiving sockets formed in the block 13. Thereupon, the plate holding bolts may be applied through an opening 93 formed in the manually operable nut 69 into position to secure the valve assembly in place, the opening 93 affording access through the nut 69 for a bolt tightening tool.

The cylindrical seat forming element 59 preferably comprises nylon or other readily formable, somewhat elastic material. Externally the element is sized for tight press fitted assembly in the inner end of the valve chamber 57 and is formed with an axial bore therethrough, said bore preferably providing a medial circumferential shoulder 95 demarking a channel 97 opening at one end of the seat element upon the chamber 35, and a connected bore 99 sized to tightly embrace the outer surfaces of the stem 65.

In order to adjustably control fluid flow through the valve seat element 59 past the end of the stem 65 enclosed therein, said stem may be formed at and adjacent its terminal end with one or more fluid flow channels between cut-away end portions of the stem 65 and the surrounding surfaces of the stem receiving bore 99. To this end, as shown more particularly in FIGS. 8 and 9, the terminal end of the stem 65 may be formed with one or more lateral grooves extending at and inwardly of the end of the stem, said grooves having maximum depth radially of the stem, at their outer ends, at the terminal end of the stem, and becoming progressively shallower toward their inner ends, remote from the terminal end of the stem. As shown, the stem may be formed with four grooves 101a, 101b, 101c and 101d having opposite sides mutually inclined at angles of the order of ninety degrees, whereby the openings defined by said grooves, within the cylindrical bore 99, have generally rhomboidal configuration defined on the outer side by the circular shape of the bore 99 and on the inner side by the inclined sides of the grooves. The rhomboidal sectional shape of the valve openings affords minimum obstruction to the passage therethrough of the generally spherical dirt particles present in well filtered oil. Accordingly, the valve with rhomboidal flow channels has very superior anti-clogging characteristics and will easily pass all dirt particles contained in reasonably well filtered oil.

The inner ends of the grooves extend, on the stem, at progressively greater distances from its terminal end, as indicated at 103. Accordingly, as the stem is advanced into the bore 99, the grooves, including their inner ends, are progressively enclosed by the member 59 and hence closed against fluid flow therethrough until finally the inner end or tip of only one groove is uncovered to provide minimal flow; and flow, of course, may be completely shut off by enclosing all grooves within the bore 99 of the sleeve 59.

It will be seen from the foregoing that the flow orifice area provided by said openings is variable in response to axial movement of the valve stem 65 in the chamber 57, being a maximum when the stem is in fully retracted position, with its tip only disposed within the end of the bore 99, remote from the shoulder 95, and becoming progressively reduced as the stem 65 is advanced into said bore 99 of the seat element, fluid flow through the valve being cut off entirely when the stem 65 reaches a position within the seat element 61 in which the inner ends of all of the cut-away portions 101 are disposed entirely within the bore 99.

In order to hold the stem 65 against turning movement in response to vibration to which the control apparatus may be subjected when in use, a circular brake shoe 105 may be mounted in a seat 107 formed in the underside of the nut 69, in position to bear upon the facing surface of the plate 33, the shoe being yieldingly pressed into braking engagement with the face of the plate 33 by a compression spring or springs 109, mounted in a cavity or cavities 111 formed in the nut 69 behind the shoe 105. Means, conveniently comprising a dowel pin 113, press fitted in a bore 115 formed in the nut 69 and having slip fitted engagement in an opening 117 in the brake shoe 105, are provided for splining the shoe with the nut, so that the spring pressed engagement of the shoe with the plate 33 will anchor the nut against turning movement with respect to the frame 13, thereby holding the valve stem in adjusted position.

Fluid is delivered to the valve chamber 57, on the side of the valve seat member 59 remote from the receiving chamber 35, through a duct 119 formed in the body 13, as by drilling the same between the bottom of the chamber 51 and the side of the chamber 57 behind the valve seat element 59, said duct 119 being connected with the bottom of the chamber 51 preferably through a conical duct enlargement 121.

In order to maintain a desired oil pressure differential on opposite sides of the valve, to thereby obtain fluid flow at a substantially uniform rate, at any selected valve setting, a duct 123 may be drilled in the block 13 from and preferably at right angles with respect to the block face 19′, said duct, at its inner end, opening upon the fluid receiving chamber 35. The cover plate 29 also may be formed with a cavity 125 drilled into the plate and opening on its inner surface which faces the surface 19′ of the block 13. The cavity 125 is disposed in alinement with the duct 123 and in open communication, therewith, through an opening 127 formed in the gasket 29′. Said gasket comprises a resilient flexible rubbery material, such as neoprene or the like, whereby those portions of the gasket which overlie the open end of the cavity 51 may form a diaphragm provided with an opening 129 in coaxial alinement with said chamber 51.

Within the chamber 51 is assembled fluid pressure responsive valve means for regulating the flow of fluid through the chamber and through the duct 119 to the inlet side of the flow control valve mechanism V. To this end, a generally cylindrical valve carrying block 131 of steel, brass, plastic or other suitable material may be snugly fitted within the chamber 51, said block being formed with outwardly opening peripheral grooves 133, 133′ at or adjacent the opposite ends of the block, for the reception of circular sealing gaskets, preferably in the form of O-rings 135, 135′ of resilient compressible rubber-like material, such as duprene or other synthetic rubber compound, for sealing the opposite ends of the block 131 peripherally with the sides of the cavity 51.

The block may be formed with a preferably axial channel 137 for receiving a valve actuating stem 139 in position for axial movement in the block. At the bottom of the block 131, the channel 137 opens into the enlarged portion 121 of the duct 119. The opposite end of the channel 137, at the top of the block 131, opens into a shallow circular cavity 141 which faces upon the inner surface of the gasket 29′. The block 131 may also be formed with one or more, and preferably with a pair of inclined channels 143 extending from the sides of the block, medially between the gaskets 135, 135′, and opening into the inner end of the channel 137 adjacent the bottom of the block, the sides of the block 131 being cut away, as at 145, to permit fluid entering the chamber 51 through the duct 53 to circulate freely to the outer ends of the channels 143. The channels 143 are each sized to press fittingly receive a cylindrical valve seating sleeve 147 of steel or other suitable seat forming material, said sleeves being firmly mounted in the outer end portions of the channels 143 in position to seatingly engage each a corresponding valve ball 149 disposed in the inner end portions of the channels 143, said balls being retained in place in the inner ends of the channels 143 by the valve actuating stem 139.

The stem 139 has a cylindrical medial portion 151 sized for free sliding movement in the channel 137 between the inner ends of the channels 143 and the upper end of the channel 137. At its lower end, the valve actuating stem is formed with a head 153 connected with the medial portion 151 through a neck 155 of diameter substantially less than that of the medial portion 151 and the head 153. The head has a lower cylindrical portion 157 and an upper truncated conical portion 159 extending between and interconnecting the lower cylindrical portion with the neck 155. The opposite sides of the cylindrical and conical portions of the head are cut away to form preferably parallel spaced apart and outwardly facing flat surfaces 161 on opposite sides of the head, the spacement of said faces being approximately equal to the diameter of the neck 155.

At its upper end, remote from the head 153, the valve actuating stem 139 may be provided with a neck 163 of reduced diameter as compared with that of the medial portion 151, said neck being sized to extend through the central opening formed in a circular gasket engaging plate 165 adapted to extend in the shallow opening 141; and the neck 163 is also adapted to extend through the opening 129 in the gasket 29'. Said neck and the medial portion 151 of the stem 139 may be axially drilled to threadingly receive the threaded stem 167 of a clamping bolt having a head 167', the stem of said bolt being sized to slidingly extend through an outer, gasket clamping plate 165', so that when the bolt is threaded into its socket in the stem portion 151, the head 167' of the bolt may clampingly squeeze the plates 165 and 165' together upon the gasket 29' and secure the plates and gasket upon the stem 139.

The inner surface of the cover plate 29 which overlies the gasket 29' may be formed with a shallow cavity 141', opposite the cavity 141, in position to enclose the outer, gasket engaging plate 165', the peripheral edges of the cavities 141, 141' being oppositely chamfered, peripherally of the cavities, as at 169. The peripheral edges of the gasket clamping plates 165, 165' also may be curvingly chamfered, as at 169', to provide a circular unrestrained gasket portion outwardly of said curvingly chamfered edges 169' of the plates 165, 165' and inwardly of the chamfered edges 169 of the cavities 141, 141'. Said circular, unconfined portion of the gasket provides a diaphragm action in response to reciprocating movement of the stem 139, the inherent resilience of the gasket 29' serving normally to retain the stem 139 in the position, shown in FIG. 1, in which the conical portion 159 of the head 153 will hold the balls 149 in position sealing the inner ends of the sleeves 147 against the passage of oil therethrough, from the duct 53 to the duct 119.

In assembling the stem 139 in the block 131, the block may be up-ended and the balls 149 dropped into place upon the inner ends of the sleeves 147. Thereupon, the stem may be introduced, head first, into the upper or outer end of the channel 137, in position with the flat faces 161 of the head facing oppositely toward the balls 149, to thereby allow the head to pass by said balls, after which the stem may be turned ninety degrees to present the conical surfaces 159 in ball engaging position. The block 131, containing the assembled stem and balls, may then be applied into the cavity 51, following which the plates 165, 165' and the gasket 29' may be assembled upon and secured to the upper or outer end of the stem, to thereby hold it in position with the conical ball actuating surfaces 159 facing the balls.

The cover plate 29 may be formed with a spring mounting socket 171 opening upon the bottom of and centered with respect to the shallow circular cavity 141', said spring housing socket being preferably coaxial with the stem 139 and containing a biasing spring 173 in position normally urging the stem 139 in a direction to retract the conical ball actuating surfaces 159 away from the balls 149, to thereby permit the same to uncover the inner ends of the valve sleeves 147. When the sleeves are thus uncovered, fluid may flow therethrough, past the balls 149 and into the duct 119, through the openings defined, on opposite sides of the head 153, by the flattened surfaces 161 thereof and the facing or surrounding surfaces of the channel 137, at the bottom of the block 131.

The plate 29 is also formed with a duct 175 which may be drilled from an end edge of the plate diametrally through the cavity 125 and continued on the opposite side of said cavity into communication with the spring receiving socket 171, the outer end of said duct being threaded, as at 175', to receive a threaded seal plug 177.

The check valve R is assembled in a preferably cylindrical chamber 179 drilled into the block 13 toward the delivery chamber 35, from and at right angles to the block face 21', the inner end of the chamber 179 preferably terminating in a bottom of conical configuration opening into a preferably cylindrical duct communicating with the chamber 35, as at its junction with the duct 123. The valve R may conveniently comprise an axially movable valve stem 183 having a head 185 at its inner end, said head terminating in a frusto-conical portion 187 adapted to seat upon the conical surfaces 181 of the cavity bottom, when the valve is closed under fluid pressure, said head 185, behind the frusto-conical portion 187, being formed with a peripheral groove 189 sized to receive a sealing gasket 191, which may conveniently comprise an O-ring of material such as duprene, or other rubbery substance, said O-ring serving to seal the head of the valve stem with the conical bottom surfaces 181 of the cavity 179.

A valve stem guiding collar 193, having an outstanding peripheral flange 193' adapted to fit snugly within the cavity 179, is mounted within the open end of the cavity in position to slidingly receive the upper end of the valve stem 183. A biasing spring 195, which may conveniently comprise a helical compression spring, may be mounted in the cavity 179, in position bearing at its opposite ends upon the flange 193' of the guide collar and upon the head 185, to thereby normally urge the head 185 and the sealing gasket 191 into sealing engagement with the conical bottom 181 of the cavity. The upper portions of the cavity may be connected with the inlet chamber 37 through an inclined duct 197, so that fluid may flow from the chamber 35, through the chamber 179, past the head of the valve, against the contrary influence of the spring 195, and thence through the duct 197 to the inlet chamber 37 which, when the apparatus is in operation, is connected with a suitable source of fluid under pressure.

When the apparatus is in service delivering oil under pressure through the chamber 35 to a load device to drive it in one direction against a return spring, the oil in the chamber 179, behind the valve head 185, will be under the pressure of fluid delivered to the inlet chamber 37, which is connected with the valve chamber through the duct 197. The pressure in the inlet and check valve chambers at such times is appreciably greater than that of fluid delivered in the chamber 35, because of the pressure drops across the valves 149 and the metering valve V. Accordingly, the check valve R will be held closed by the combined action of the spring 195 and the fluid pressure differential on opposite sides of the valve head 185. However, when the supply of oil under pressure to the inlet chamber 37 is cut off, oil pressure in the outlet chamber 35 becomes greater than that in the inlet chamber, because of the action of the return spring in the driven device. Said return spring is very much stronger than the relatively weak check valve spring 195, thereby permitting fluid to flow through the check valve to the inlet chamber.

Test channels 199, 199' may be drilled in the block 13 to permit the connection of pressure gauges in the duct system at desirable locations, as on the opposite sides of the flow control valve V. To this end, the channels 199, 199' may be drilled respectively from and at right angles with respect to the surfaces 19 and 21 of the block 13 in position to connect one with the receiving chamber 35, as at its junction with the duct 123, and the other with the duct 119, as at its junction with the conically enlarged duct portion 121, the outer ends of said test ducts 199, 199' being enlarged and threaded for the reception of sealing plugs 201 or pressure gauges.

The flow control device of the present invention may be used to control the delivery of oil under pressure to a hydraulic device actuated in one direction by fluid under pressure and in the opposite direction, as by means of a return spring or other biasing means, when the delivery of fluid under pressure is cut off. To this end, oil under pressure may be delivered to the inlet opening 37 under the control of shut-off valve means (not shown). When such valve means is opened for the delivery of fluid under pressure to the control device 11, oil will flow from the inlet chamber 37 through the duct 39 to the top of the filtering chamber 41 and thence through the filter into the bottom of the chamber. The filtered oil may travel, from the bottom of the chamber 41, through the ducts 49 and 53 into the compensating valve chamber 51. In the chamber 51, the oil will flow around the body 131 and through the valve seat sleeves 147 under the control of the ball valves 149. When the ball valves are open, oil will flow past the flat surfaces 161 of the stem 139 into the enlarged duct portion 121 and then through the duct 119 to the inlet side of the metering valve V.

When the valve V is open, oil will flow through the notches 101 and the sleeve 59 into the delivery chamber 35 which, being connected with a suitable hydraulic delivery conduit system, will deliver oil to the hydraulic load device with which the flow control apparatus is operatively connected. By controlling the sectional area of the fluid flow channel or channels formed between the valve stem 65 and the bushing 61, the rate of flow of oil to the load device may be accurately determined and controlled by turning the manually operable nut 69.

Oil also is charged into the spaces defined by the duct 123, the cavity 125, the duct 175 and the connected chambers 141' and 171 on the outer side of the diaphragm. As a consequence, when the device is in operation, oil under pressure will be applied on both sides of said diaphragm. Under static conditions, when the supply of oil is cut off, there will be equal hydraulic pressure on both sides of the diaphragm. The spring 173, however, will apply an unbalanced force upon the stem 139, tending to shift the same in a direction to open the ball valves 149, thereby allowing oil to flow through the compensator mechanism, whenever and so long as oil under pressure is being supplied to the flow control device. There will, of course, be a pressure drop of finite value across the opening between the valve sleeves 147 and the balls 149; and there will also be an appreciable pressure drop across the flow control valve V.

In order to maintain a uniform rate of flow of oil through the valve V to the driven device, it is necessary to maintain the pressure drop, across the flow control valve V, at a constant uniform value. This is accomplished by regulating the flow of oil past the ball valves 149 of the compensating apparatus. As the driven device is moved, in response to the delivery of oil under pressure thereto through the chamber 35, oil pressure in the chamber 141' on the outer side of the diaphragm becomes less than that in the chamber 51 and 141, due to the pressure drop across the flow control valve V. Should the driven device meet with increased opposition to its movement, the pressure will increase in chamber 35. Such increase in pressure will tend to increase the pressure in the chamber 141' on the outer side of the diaphragm, thereby causing the stem 139 to move in a direction to increase the valve opening at the balls 149. As a consequence, the pressure drop across the ball valves will become less and the pressure on the inlet side of the flow control valve V will increase, thereby tending to maintain the pressure drop across the flow control valve, between the duct 119 and the delivery chamber 35, at a constant value. The maintenance of pressure drop across the flow control valve at a constant value assures the maintenance of oil flow at a constant rate to the driven device. The spring 173 determines the pressure differential across the flow control valve. The stronger the spring the greater the pressure difference maintained across the valve and the greater the flow rate of oil to the load device at any selected valve setting.

When the hydraulic pressure is removed at the inlet opening 37, oil pressure in the chamber 35, of course, will drop and permit oil to flow back into the delivery chamber 35 and thence through the check valve R and the duct 197 to the inlet chamber 37, under the pressure exerted by the return stroke bias of the driven device.

The pressure drop regulator apparatus C does not fully compensate due to that area of the bushings 147 which allows oil to press upon the balls 149, thereby urging the stem 139 in a direction toward the bottom of the block 131. Such oil pressure force is added to the force of the spring 173. As said oil pressure force changes, a corresponding change will occur in the differential pressure on the opposite sides of the diaphragm. As a consequence, the pressure drop across the flow control valve V and the consequent flow rate will vary slightly. This variation is relatively small and insignificant, since the area of the bushings 147 is small as compared with the area of the diaphragm. The arrangement will compensate effectively and adequately at very low flow rates, since the ball valves will seal more effectively than any other kind of valve, and the diaphragm is entirely leak-proof.

The device of the present invention is able to control fluid flow at exceedingly small flow rates. The device is of compact construction and of symmetrical design, making it readily adapted for assembly on tool slides and other hydraulic load devices with which it may be desired to use the device. The flow control valve design inherently tends to avoid clogging by dirt particles of the sort present in reasonably well filtered oil. The device is easy to adjust and is not overly sensitive, thereby providing effective regulation and control. The varying lengths of the grooves along the valve stem 65 afford very fine adjustment and single groove shut-off. The design affords a device that is essentially and effectively leak-proof.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of demonstrating the invention.

The invention is hereby claimed as follows:

1. A flow control device comprising a frame having formed therein a fluid inlet chamber, a fluid delivery chamber, and a duct system interconnecting said chambers and including a check valve connected between and permitting fluid flow in one direction from the delivery chamber to the inlet chamber, an adjustable flow metering valve in said duct system for regulating the flow of fluid to said delivery chamber, and pressure regulating valve means connected in said system between said inlet chamber and said metering valve and operable in response to fluid pressures prevailing in the system, in advance of and behind the metering valve, to adjust the pressure of fluid delivered to the metering valve as a function of fluid pressure at the discharge side of the metering valve, to thereby maintain a uniform fluid pressure differential across the metering valve.

2. A flow control device as set forth in claim 1, including a filter element disposed in said system between said inlet chamber and said metering valve.

3. A flow control device as set forth in claim 1, including normally closed test ducts connected in said system on opposite sides of said metering valve and formed, when open, for connection with pressure gauges.

4. A flow control device as set forth in claim 1, wherein said regulating valve means comprises a flow controlling valve element, a diaphragm, having opposed sides exposed respectively to fluid pressure prevailing across the metering valve, and a shiftable member drivingly connected with said diaphragm and with said valve element to actuate the same in response to diaphragm movement.

5. A flow control device as set forth in claim 4, including a spring normally biasing the shiftable member in one direction.

6. A flow control device as set forth in claim 4, wherein the valve element comprises a ball and an associated circular seat, and cam means actuated by said shiftable member for determining the spacement of the ball and seat.

7. A flow control device as set forth in claim 1, wherein the metering valve comprises a sleeve and an axially shiftable stem snugly fitted in said sleeve and having a longitudinally extending cut-away portion along a side of the stem, said portion having progressively decreasing depth from a maximum value toward zero depth, at the opposite ends of said portion, whereby the area of the flow channel, defined between said cut-away portion and the surrounding portions of the sleeve, may be varied by relative axial movement of the sleeve and stem, and may be closed off completely when the zero depth end of the cut-away portion is enclosed within the sleeve.

8. A flow control device as set forth in claim 7, wherein a portion having substantially triangular sectional shape is removed from the stem to form said cut-away portion.

9. A flow control device as set forth in claim 7, wherein the sleeve is made of slightly stretchable material, such as nylon, and is sized slightly smaller than the stem to contractingly embrace the same.

10. A flow control device comprising a slab of material having front and rear faces and a pair of oppositely facing, flat, truncated surfaces inclined with respect to the adjacent side edge surfaces of the slab, said slab providing a frame having a central fluid delivery chamber formed therein and opening upon one of said faces of the slab, said frame also having a fluid inlet chamber opening upon one of said flat surfaces and a duct system interconnecting said chambers, an adjustable flow metering valve in said duct system for regulating the flow of fluid to said delivery chamber, said metering valve including means forming a circular seat communicating with said fluid delivery chamber and a flow controlling stem movable with respect to said seat to regulate fluid flow therethrough to the delivery chamber, and a turnable member supported at the other of said flat surfaces and drivingly connected with said stem to shift the same on said seat.

11. A flow control device as set forth in claim 10, wherein said slab is of generally square configuration having two pairs of mutually normal, oppositely facing, parallel side edge surfaces, and said truncated surfaces make angles of the order of 45° with the adjacent side edge surfaces.

12. A flow control device as set forth in claim 10, wherein the slab has thickness of the order of one inch and width of the order of two inches between its opposite side edge surfaces.

13. A flow control device as set forth in claim 10, including a cover plate formed with a cavity having a medial seat defining an inlet and outlet compartment in said cavity on opposite sides of the seat, means to secure the plate upon said frame, and a filter element on said seat in position connecting said inlet and outlet compartments in said duct system and respectively with said fluid inlet chamber and said metering valve.

14. A flow control device as set forth in claim 10, including a cover plate formed with a cavity and means to secure the plate on said frame in position overlying a registering cavity in the frame, a flexible diaphragm secured, by and between said plate and frame, in position extending between said cavities, a pressure responsive valve connected between the inlet chamber and said metering valve, and means for opening and closing said pressure responsive valve in response to movement of the diaphragm in said cavities, said frame and cover plate being formed with interconnected ducts placing the cover plate cavity in open communication with one side of the metering valve, the registering cavity in the frame being disposed in open communication with the other side of the metering valve.

15. A flow control device comprising a frame forming a housing providing a valve chamber, a sleeve forming a valve seat press fittedly fixed in the chamber, said sleeve forming fluid inlet and discharge ends, means forming a fluid supply duct on said frame and opening into said valve chamber in open communication with the inlet end of the sleeve, a stem axially movable in said chamber and extending outwardly of the inlet end of the sleeve, said stem having a portion adapted to extend in fluid-tight sliding engagement within said sleeve, said stem having at least two cut-away portions extending longitudinally thereon and each having progressively reduced depth from one end thereof toward the opposite or shut-off end, where the cut-away portions have zero depth and merge with the surface of the stem, said cut-away portions, with the interior of the valve seat sleeve, forming longitudinal flow channels through the sleeve, when the valve is open, means to shift the stem and sleeve axially to progressively cover said cut-away portions in the direction of decreasing depth, whereby to progressively reduce fluid flow through the valve and to shut off flow entirely, when the shut-off end of the cut-away portion is enclosed within the sleeve, and vice versa to open the valve and progressively increase flow therethrough, the axial portions on said stem at which respective cut-away portions merge with the surface of said stem being axially spaced on said stem to provide different shut-off and opening positions for the respective cut-away portions upon axial movement of said stem relative to said sleeve, including a manually turnable member for axially shifting the stem with respect to the sleeve, and brake means interconnecting the turnable member and the frame to hold the valve stem in axially adjusted position with respect to the sleeve.

16. A flow control device comprising a frame forming a housing providing a valve chamber having a top opening upon a face of the frame, a valve mounting block snugly received in the chamber, said block having a top, extending at the open end of the chamber, and an axial channel opening at its opposite ends upon the bottom of the block and into a shallow cavity at the top of the block, said block having one or more inclined ducts formed therein between the side of the duct, medially of its ends, and the axial channel adjacent the bottom of the block, a sleeve firmly press fitted in said inclined duct and presenting the inner end of the sleeve in position spaced outwardly of and facing into said axial channel, a valve ball disposed in said inclined duct at the inner end of said sleeve, a valve stem axially movable in said axial channel and having a head forming means for shifting the ball toward and away from the sleeve in response to axial movement of the stem in opposite directions in the axial channel, said stem extending at the top of the block in said shallow cavity, a diaphragm forming gasket overlying the open end of the chamber and the top of the block, including said shallow cavity, a removable cover plate secured upon the frame in position overlying said gasket, said cover plate having a cavity facing upon said gasket in registration with said shallow cavity of the block, means securing the gasket to the valve stem, whereby the gasket may form a stem driving diaphragm between the facing cavities in the block and cover plate, means forming a fluid supply duct on said frame, in open communication with the outer end of said sleeve, a fluid delivery duct in communication with said axial channel and said cavity in the top of the block on one side of the diaphragm, and fluid conducting duct means in said cover plate in open communication with the cover plate cavity on the opposite side of the diaphragm.

17. A flow control device as set forth in claim 16, wherein a pair of said inclined ducts connect with the axial channel in diametrical opposition, the head of said stem being cut away to form oppositely facing flat faces insertable between a ball in each channel, upon application of the stem head first in the axial channel, from the top of the block, the ball actuating cams being formed on opposite sides of the head between said flat faces, and said stem being turnable, when in position between the balls and the bottom of the block, to dispose said ball actuating cams in ball engaging position.

References Cited

UNITED STATES PATENTS

| | | | |
|---|---|---|---|
| 1,099,389 | 6/1914 | Morrison | 251—368 X |
| 1,640,842 | 8/1927 | Loomis | 137—501 |
| 2,121,311 | 6/1938 | Anderson et al. | 137—64 X |
| 2,536,141 | 1/1951 | Rockwell | 137—501 X |
| 2,623,331 | 12/1952 | Greening | 137—501 |
| 2,742,764 | 4/1956 | St. Clair | 137—501 X |
| 2,807,144 | 9/1957 | St. Clair | 137—501 X |
| 2,844,352 | 7/1958 | Dahl | 251—368 X |
| 2,980,392 | 4/1961 | Greenwood | 251—205 X |
| 3,204,660 | 9/1965 | Nelson et al. | 137—505.38 |
| 3,221,767 | 12/1965 | McCarty et al. | 137—625 X |

FOREIGN PATENTS

| | | |
|---|---|---|
| 45,599 | 4/1932 | Denmark. |
| 978,483 | 12/1964 | Great Britain. |

M. CARY NELSON, *Primary Examiner.*

R. J. MILLER, *Assistant Examiner.*